(12) United States Patent
Salvatore et al.

(10) Patent No.: US 10,743,153 B2
(45) Date of Patent: Aug. 11, 2020

(54) DATA COLLECTION FROM AUXILIARY CONTROLLER AREA NETWORK DEVICES

(71) Applicant: ExxonMobil Research and Engineering Company, Annandale, NJ (US)

(72) Inventors: John A. Salvatore, Elmer, NJ (US); Michael C. Tucker, Medford Lakes, NJ (US); Aparna Subramanian, West Chester, PA (US); Riccardo Conti, Medford, NJ (US); Bhaskar Prabhakar, Mount Laurel, NJ (US)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 175 days.

(21) Appl. No.: 16/123,426

(22) Filed: Sep. 6, 2018

(65) Prior Publication Data

US 2019/0090106 A1    Mar. 21, 2019

Related U.S. Application Data

(60) Provisional application No. 62/558,914, filed on Sep. 15, 2017.

(51) Int. Cl.
*H04W 4/38* (2018.01)
*G07C 5/00* (2006.01)
(Continued)

(52) U.S. Cl.
CPC .............. *H04W 4/38* (2018.02); *F01M 11/10* (2013.01); *G01K 1/026* (2013.01); *G07C 5/008* (2013.01);
(Continued)

(58) Field of Classification Search
CPC ................... H04W 4/38; H04L 12/403; H04L 2012/40215; F16N 2200/00; G01K 2205/00
See application file for complete search history.

(56) References Cited

U.S. PATENT DOCUMENTS

| | | | |
|---|---|---|---|
| 7,257,426 B1 | 8/2007 | Witkowski et al. | |
| 2008/0147265 A1* | 6/2008 | Breed | G07C 5/008 |
| | | | 701/424 |

(Continued)

OTHER PUBLICATIONS

Dennir et al., Engine Compartment UWB Channel Model for Intravehicular Wireless Sensor Networks, Jul. 2014, IEEE Transactions on Vehicular Technology, vol. 63 No. 6, p. 2498 (Year: 2014).*
International Search Report and Written Opinion PCT/US2018/049703 dated Dec. 3, 2018.

*Primary Examiner* — Alan D Hutchinson
*Assistant Examiner* — Andy Schneider
(74) *Attorney, Agent, or Firm* — Anthony G. Boone

(57) ABSTRACT

Systems and methods are provided for enabling communication, without breaching the engine firewall, between a datalogger located on one side of the firewall and one or more sensor devices that are located on the opposite side of the firewall. The systems and methods described herein can allow a transmitting node (i.e., a transmitting datalogger) to transmit collected data (from an auxiliary sensor) to a receiving node (i.e., a receiving datalogger) while reducing or minimizing various difficulties associated with addition of an auxiliary sensor in the engine environment. The transmission of data from the transmitting node to the receiving node can correspond to wired data communication or wireless data communication.

20 Claims, 5 Drawing Sheets

(51) Int. Cl.
    *H04L 12/40*         (2006.01)
    *G07C 5/08*          (2006.01)
    *H04W 4/80*         (2018.01)
    *G01K 1/02*          (2006.01)
    *H04L 12/403*       (2006.01)
    *H04W 4/40*         (2018.01)
    *F01M 11/10*       (2006.01)

(52) U.S. Cl.
    CPC ............ *G07C 5/085* (2013.01); *H04L 12/403* (2013.01); *H04L 12/40006* (2013.01); *H04W 4/80* (2018.02); *F16N 2200/00* (2013.01); *F16N 2260/02* (2013.01); *F16N 2270/00* (2013.01); *G01K 2205/00* (2013.01); *H04L 2012/40215* (2013.01); *H04L 2012/40273* (2013.01); *H04W 4/40* (2018.02)

(56) References Cited

U.S. PATENT DOCUMENTS

| | | | |
|---|---|---|---|
| 2012/0005393 A1 | 1/2012 | Hu et al. | |
| 2013/0204484 A1* | 8/2013 | Ricci | B60W 50/00 |
| | | | 701/29.4 |
| 2015/0180677 A1 | 6/2015 | Logvinov et al. | |

* cited by examiner

DATA COLLECTION FROM AUXILIARY CONTROLLER AREA NETWORK DEVICES

CROSS-REFERENCE TO RELATED APPLICATIONS

This application claims priority to U.S. Provisional Application Ser. No. 62/558,914 filed Sep. 15, 2017, which is herein incorporated by reference in its entirety.

FIELD

Systems and methods are provided for communication between auxiliary controller area network devices and in-vehicle collection systems.

BACKGROUND

Dataloggers are becoming increasingly popular for capture of data that is broadcast by a vehicle's electronic control module (ECM) or electronic control unit (ECU). ECU and ECM are used interchangeably. A datalogger (or data recorder) is typically an electronic device that records data over time, such as recording data from a built-in device like an ECM. Dataloggers can capture data from real-time in-situ measurements of vehicle parameters. Such captured data can be used in a variety of ways, such as for detecting and quantifying engine duty cycle severity, measuring fuel economy, determining engine oil performance, predicting differences in driver styles and/or drive cycles. Dataloggers can be configured to be a transmitting node or a receiving node or a trans-receiver node.

Although dataloggers can be suitable for collecting data from an ECM, providing data from auxiliary sensors not associated with the ECM to a datalogger within the passenger compartment of a vehicle can pose difficulties. In typical motor vehicles, the engine compartment and the passenger compartment of the vehicle are separated by a barrier structure referred to as a firewall. Conventional methods for interfacing a datalogger in the passenger compartment with auxiliary sensors mounted within the engine compartment have typically involved breaching the firewall, so that a cable can be passed through the firewall to allow a direct wired connection between the sensor(s) in the engine compartment and the datalogger in the passenger compartment. While breaching the firewall is feasible, such breaches of the firewall are undesirable for a variety of reasons that are well-known in the automotive industry.

One proposed method for overcoming the difficulty of interfacing a datalogger with auxiliary sensors is to use the preexisting 12 volt direct current power line bus (and/or up to 48 volts direct current) in the vehicle. Although the direct current power line bus is designed for power delivery, the power line bus can also be suitable for transmitting carrier signals containing data. U.S. Patent Application Publication 2015/0180677 provides an example of a power line communication system and a corresponding protocol for communicating over a powerline. While examples of powerline communication have been proposed, however, commercial implementations of powerline communication that allow for communication between sensors in an engine compartment and dataloggers on the opposite side of the vehicle firewall are not available. As a result, there is a need for systems and methods that can allow for communication between an ECM and/or auxiliary engine sensor and a datalogger in the vehicle cab/passenger compartment (and/or on the opposite side of the vehicle firewall) while overcoming any difficulties that may be encountered during real-world implementation of such systems and methods.

U.S. Pat. No. 7,257,426 describes wireless communications systems and methods. The systems and methods are adapted for use in automotive applications for enabling automatic, high-speed, wireless voice and/or data communications link to be established when an RF (radio frequency) transceiver located on a vehicle comes within range of a second RF transceiver.

SUMMARY

In various aspects, methods for acquiring engine data and auxiliary sensor data are provided. The methods can include determining, by a transmitting node, an activity status of a receiving node. For example, the activity status can be determined based on detecting a response from the receiving node. A polling rate for determining the activity status of the receiving node can be once per 60 seconds or less. The transmitting node can be housed in a transmitting node enclosure in an engine compartment of a vehicle. The transmitting node can receive data from an auxiliary sensor. Optionally, the data can correspond to data collected by the auxiliary sensor in response to the determination of the activity status of the receiving node. At least a portion of the data can then be transmitted to a receiving node located on an opposing side of the firewall relative to the transmitting node, such as by wired communication and/or wireless communication. Optionally, the auxiliary sensor can correspond to an oil quality sensor and/or a transmission fluid quality sensor and/or any CAN based sensor. Optionally, the receiving node can further receive data from an engine control module.

In some aspects, the method can further include detecting at least one of a temperature inside the transmitting node enclosure and a temperature associated with the transmitting node. If a detected temperature inside the enclosure or a detected temperature associated with the transmitting node is greater than a threshold temperature, the threshold temperature optionally being 55° C. to 75° C., the transmitting node can be shut down.

In some aspects, the method can further include sending, by the receiving node, at least a portion of the transmitted data to a network receiver located external to the vehicle.

In some aspects, the transmitting node and the receiving node can be not in data communication via a controller area network that includes the engine control module. Additionally or alternately, the auxiliary sensor can be not in data communication with the engine control module.

In various aspects, an engine data acquisition system is also provided. The system can include an auxiliary sensor located within an engine compartment of a vehicle. The system can further include a transmitting node enclosure in the engine compartment. The transmitting node enclosure can include an ingress protection rating versus liquids of 7 or more, such as an ingress protection rating of IPX7, IPX8, IP67, or IP68. A transmitting node can be located within the transmitting node enclosure. The transmitting node can be in data communication with the auxiliary sensor. The transmitting node can further include a sleep mode function with a sleep time interval of about 60 seconds or more. A temperature sensor can also be located within the transmitting node enclosure in data communication with the transmitting node. The system can further include a receiving node in data communication with the transmitting node. The receiving node can be located on an opposing side of the engine firewall relative to the transmitting node. Optionally, the auxiliary sensor optionally can correspond to an oil quality sensor and/or a transmission fluid quality sensor.

In some aspects, the data communication between the transmitting node and the receiving node can correspond to wireless communication. The transmitting node can include a first wireless communication system while the receiving node can include a second wireless communication system. The wireless communication can correspond to any convenient type of wireless communication, such as Bluetooth communication, Wi-Fi communication, communication using a system compatible with an IEEE 802.11 specification, or a combination thereof. Additionally or alternatively, the data communication between the transmitting node and the receiving node comprises wired communication via a direct current power line bus.

DETAILED DESCRIPTION

Figure 1:
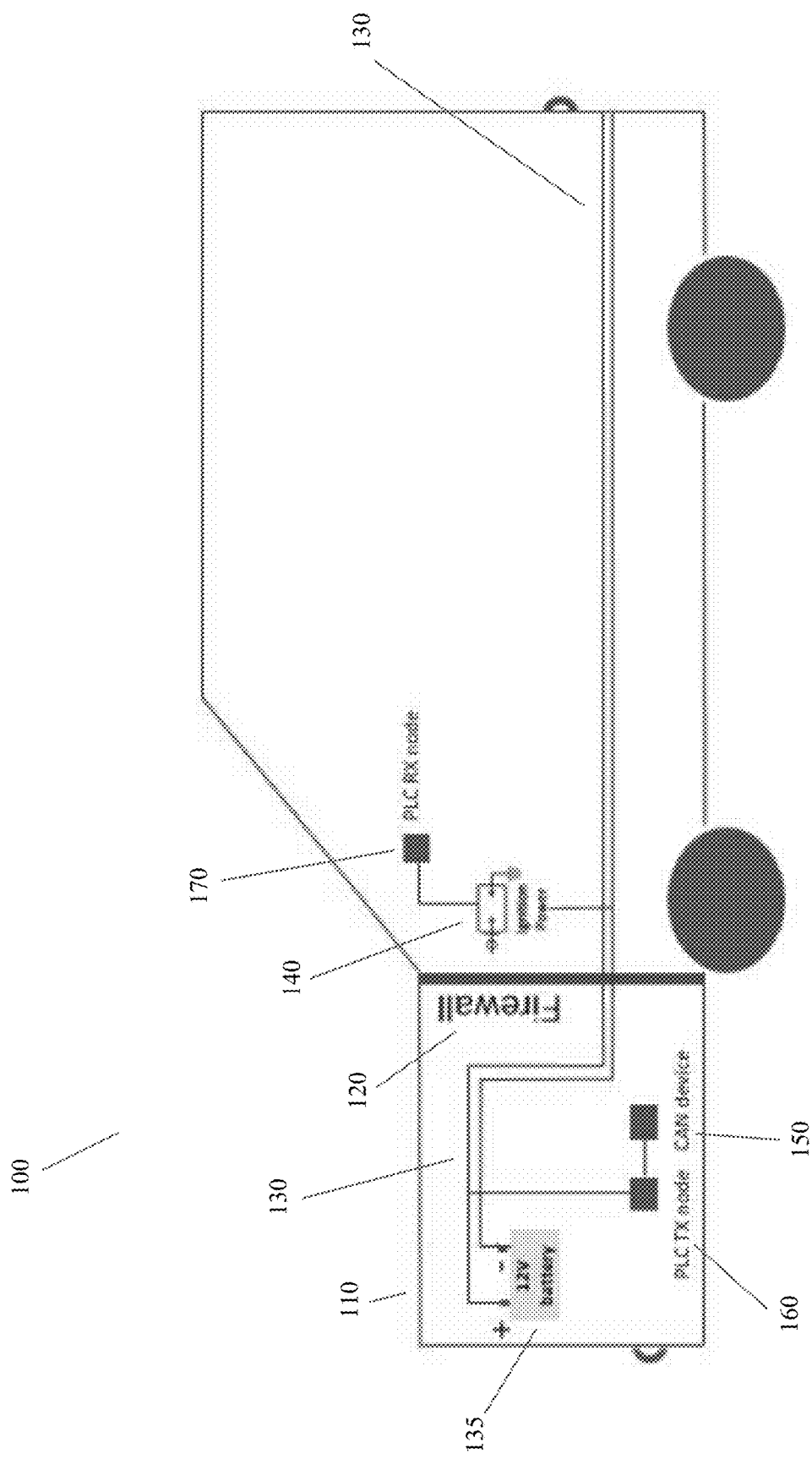
FIG. 1 schematically shows an example of a system for power line communication between a transmitting node in an engine compartment and a receiving node in the passenger compartment.

All numerical values within the detailed description and the claims herein are modified by "about" or "approximately" the indicated value, and take into account experimental error and variations that would be expected by a person having ordinary skill in the art.

Overview

In various aspects, systems and methods are provided for enabling communication, without breaching the engine firewall, between a datalogger located on one side of the firewall and one or more sensor devices (optionally including the Engine Control Module) that are located on the opposite side of the firewall. It has been discovered that implementing communication between auxiliary sensors on one side of a firewall and a datalogger on the opposite side of the firewall poses a variety of challenges beyond the communication of data. The systems and methods described herein can allow a transmitting node (i.e., a transmitting datalogger) to transmit collected data (from an auxiliary sensor) to a receiving node (i.e., a receiving datalogger) while reducing or minimizing one or more of these problems. For example, the transmission of the collected data can be performed while maintaining a suitable temperature for the transmitting node. Additionally or alternatively, the systems and methods can allow the transmitting node to enter a sleep mode. This can allow the transmitting node to be powered from the vehicle battery without requiring access to switched 12 volt power while reducing or minimizing the drain on the battery. Additionally or alternatively, the systems and methods can reduce or minimize environmental damage to the auxiliary sensor and/or the transmitting node, such as environmental damage due to engine vibrations or environmental damage during periods when the vehicle is exposed pressurized water. The transmission of data from the transmitting node to the receiving node can correspond to wired data communication or wireless data communication.

A variety of additional types of sensors are available that can potentially be used to acquire data for characterizing an engine operating environment. Examples of additional types of sensors or data acquisition devices can include, but are not limited to, temperature sensors (i.e., associated with one or more locations and/or fluids in the engine); pressure sensors; viscosity sensors; fluid quality sensors; and/or any other convenient type of sensor, such as a sensor that provides information that supplements the data available from the ECM. Such additional sensors can potentially provide valuable information. However, engine control modules are typically configured to only accept/monitor/transmit data from sensors that the manufacturer is aware of at the time of vehicle assembly.

Current commercially available vehicles typically include at least one internal or primary controller area network (CAN) that is installed during vehicle construction. This primary CAN is used to allow a variety of diagnostic values to be collected by the engine control module. One or more communication ports can be included in the vehicle compartment to allow for easy access to this diagnostic information when desired. Because the primary CAN is installed during vehicle assembly, the primary CAN does not impact the integrity of the engine firewall. Unfortunately, engine control modules are typically not configured to allow for addition of auxiliary sensor devices. Instead, engine control modules typically can only accept/monitor/transmit data from sensors that the manufacturer is aware of at the time of vehicle assembly. Though it is typically not feasible to transmit auxiliary sensor data to a datalogger by passing the data to the ECM, a direct wired connection can be used to transfer data directly to the datalogger from the auxiliary sensor without interfering with the ECM. However, such a transfer would require breaching the firewall or the passenger compartment.

In various aspects, systems and methods are provided that can overcome the above difficulties to allow one or more auxiliary sensors to be added to the engine compartment that can communicate with a datalogger in the passenger compartment (i.e., on the opposite side of the firewall) while avoiding a breach of the firewall. The communication can be facilitated by using a transmitting node in the engine compartment to receive and log data from the auxiliary sensor. The transmitting node can then pass the logged data to a receiving node in the passenger compartment (or another location on the other side of the firewall). In some aspects, the transmitting node can transmit data to a receiving node by using wired communication via the 12 volt direct current power line (or other vehicle battery power line). In this type of aspect, the transmitted data can be encoded using any convenient type of transmission modulation scheme to allow for recovery of the transmitted data from the power line electrical signal. In this type of aspect, the transmitting node and the receiving node can include a transceiver chip for modulation and de-modulation of the data. Examples of suitable modulation schemes include, but are not limited to, binary phase-shift keying and frequency-shift keying. Additionally or alternatively, the transmitting node can transmit data to a receiving node using wireless communication using a similar modulation/de-modulation technique. Suitable types of wireless protocols can include, but are not limited to, Wi-Fi communication, Bluetooth communication, and/or other types of communication compatible with the specifications under IEEE 802.11.

FIG. 1 shows an example of a configuration for providing communication between a sensor in an engine compartment and a datalogger in the passenger compartment. In FIG. 1, an auxiliary sensor 150 (or other type of auxiliary CAN device) is located within the engine compartment 110 of a vehicle 100. The auxiliary sensor is in data communication with a transmitting node 160. The transmitter 160 can be referred to as a transmitting node based on the role of transmitter 160 in transmitting data to receiver 170 located on the opposite side of firewall 120. The receiver 170 can be referred to as the receiving node. In the example shown in FIG. 1, the data communication between transmitting node 160 and receiving node 170 can correspond to data communication via power line 130. Power line 130 corresponds to the direct current power line in the vehicle for distributing power from battery 135. In other examples, data communication between transmitting node 160 and receiving node 170 can correspond to wireless data communication. In the example shown in FIG. 1, transmitting node 160 is connected directly to power line 130, while receiving node 170 is connected to power line 130 via ignition power system 140. Based on this configuration, transmitting node 160 is connected to a portion of power line 130 that is always on, as opposed to receiving node 170, which receives a "switched" version of power that can be turned on and off.

During operation the receiving node 170 can receive data from a primary controller area network (CAN) to log data from the ECM. Depending on the aspect, the receiving node 170 can request data from the ECM, or the receiving node 170 can listen to the primary CAN and log values sent to and/or from the ECM. The receiving node 170 can also listen to the power line 130 to receive messages from transmitting node 160.

In this discussion, dataloggers are described as nodes, as would be expected by those of skill in the art. Thus, a transmitting node corresponds to a transmitting datalogger, while a receiving node corresponds to a receiving datalogger.

In this discussion, devices that are in data communication are defined as devices that are in wired data communication and/or wireless data communication. Wired data communication can include, but is not limited to, communication via a power line, such as a 12 volt direct current power line. Wireless data communication can include data communication via any convenient wireless protocol, such as Wi-Fi or Bluetooth.

In this discussion, an auxiliary sensor is defined as any sensor that is not in data communication with the engine control module. It is noted that an engine control module can sometimes be referred to as a powertrain control module or engine control unit.

Datalogger Temperature and Timing Management

One of the challenges to including a transmitting node in the engine compartment of a vehicle is maintaining a desired temperature for the transmitting node. Exposure to heat can potentially damage electronic circuits and/or can shorten the life expectancy of the transmitting node. It has been discovered that two separate sources of heat can potentially pose problems for a transmitting node in the engine compartment. Some difficulties can relate to heat generated by the engine. Additionally, it has been discovered that operation of the transmitting node itself could potentially contribute undesirable amounts of heat to the transmitting node environment.

In an initial set of tests, a transmitting node was placed in the engine compartment and configured for wired data communication with a receiving node via the 12 volt direct current power line. The transmitting node (within the engine compartment) was placed within an enclosure to protect the transmitting node from the engine environment. The transmit frequency for the transmitting node was initially set so that the transmitting node provided information to the receiving node at a frequency of once per second. During the initial set of tests, the engine was not running. Under these conditions, it was unexpectedly discovered that heat generated by the transmitting node resulted in temperatures of up to roughly 90° C. within the enclosure, and up to roughly 60° C. for the transmitting node circuit boards. After turning the engine on, heat from the engine resulted in further temperature increase for the transmitting node and the enclosure.

Based on the initial set of tests, a lower transmit or polling frequency of once per two minutes was selected. This reduced the temperature within the transmitting node enclosure from roughly 90° C. to roughly 46° C. More generally, it is believed that a transmit or polling frequency of once per 45 seconds or less (i.e., the average time between transmissions is at least 45 seconds), or once per 60 seconds or less, or once per 90 seconds or less, or once per 120 seconds or less, can be beneficial for reducing or minimizing temperatures associated with the transmitting node. In some aspects, the interval between transmissions to the receiving node can be as long as once every 300 seconds or less, or once every 600 seconds or less, or possibly a still longer polling interval.

In addition to temperature management, another difficulty with including a transmitting node in the engine environment is providing a switched power source. In other words, the available power line for connection to the transmitting node may correspond to power lines that are always in communication with the battery. As a result, the transmitting node can have access to power when the engine is off. This can potentially result in draining of the battery while the engine is off.

To avoid this difficulty, in various aspects the transmitting node can include a sleep mode function, so that the transmitting node can determine that the receiving node is on prior to collecting further data and/or prior to sending any data to the receiving node. For the sleep mode function, the transmitting node can wake up and poll the receiving node at a desired frequency. If the receiving node is on (meaning the engine is on), the receiving node can respond to the message from the transmitting node. This response can tell the transmitting node to power the auxiliary sensor and/or continue transmission of data. If the receiving node is off, the transmitting node will not receive a response. The lack of response can cause the transmitting node to enter a sleep mode, where no further data is collected or transmitted. The transmitting node can then remain off until the next polling event for communicating with the receiving node. Similarly, the auxiliary sensor can remain off until a response is received from the receiving node. As noted above, any convenient frequency can be used for polling the activity of the receiving node by the transmitting node.

In addition to entering sleep mode based on activity of the receiving node, the transmitting node can also be shut down based on the temperature within the transmitting node enclosure. For example, a temperature sensor can be included within the transmitting node enclosure. If the temperature at the temperature sensor exceeds a threshold value, the transmitting node can enter a sleep mode to avoid further heat generation and/or avoid damage to the transmitting node. Depending on the aspect, suitable threshold values for the temperature sensor in the transmitting node enclosure can correspond to, for example, 55° C. to 75° C. The temperature sensor can be configured to determine a temperature associated with any convenient location in the transmitting node. In some aspects, the temperature can be associated with one or more circuit boards inside the transmitting node enclosure, such as a circuit board for the transmitting node. In some aspects, the temperature can be associated with a location that is expected to have a higher temperature than the transmitting node circuit boards. Optionally, the transmitting node enclosure can include one or more conventional features for heat dissipation.

In addition to managing the temperature, the transmitting node can also monitor real clock time to verify that data captured from a data acquisition device matches the clock rate. This can improve data reliability. For example, when attempting to analyze real time data and match the time dependence with other collected data, the ability to verify the clock rate versus real clock time can ensure that the correct time dependence is associated with data captured by the datalogger. Additionally or alternately, the transmitting node can also be configured to automatically reset after a power failure and/or based on a shutdown event due to excessive temperature in the transmitting node enclosure. This can allow the transmitting node to obtain values from the auxiliary sensors that may reflect the nature of the shutdown event and/or temperature excursion. The receiving node can similarly be configured to automatically reset after a power failure and/or based on a shutdown event due to excessive temperature.

Transmitting Node Environmental Management

In addition to temperature, other environmental factors typical of an engine environment can impact a transmitting node. An example of an additional environmental factor can be the intermittent presence of water at elevated pressures in an engine environment. Washing of vehicles is a routine activity performed as needed. Typical washing of a vehicle can include using pressurized sprays or jets of water. During a wash event, a transmitting node can be exposed to this pressurized water.

Because transmitting nodes are not typically employed in environments including pressurized water, it was observed that transmitting nodes located in an engine environment during a wash event tended to suffer from a variety of failures. To overcome this, the transmitting node enclosures were modified to have an International Protection rating of IP 68. In addition to providing a waterproof enclosure for the transmitting node, the IP 68 enclosure also reduced or minimized exposure of the transmitting node to particles in the engine environment. More generally, ratings of X7, X8, 67, and 68 are believed to be suitable for protecting a transmitting node in an engine environment.

Engine vibrations were also observed to present difficulties in initial testing. However, use of standard wiring and connectors with resistance to vibrations, such as Molex™ connectors, were found to be suitable for avoiding damage to the transmitting node and associated wiring due to engine vibrations.

Example of Datalogger Wireless Communication

Figure 2:
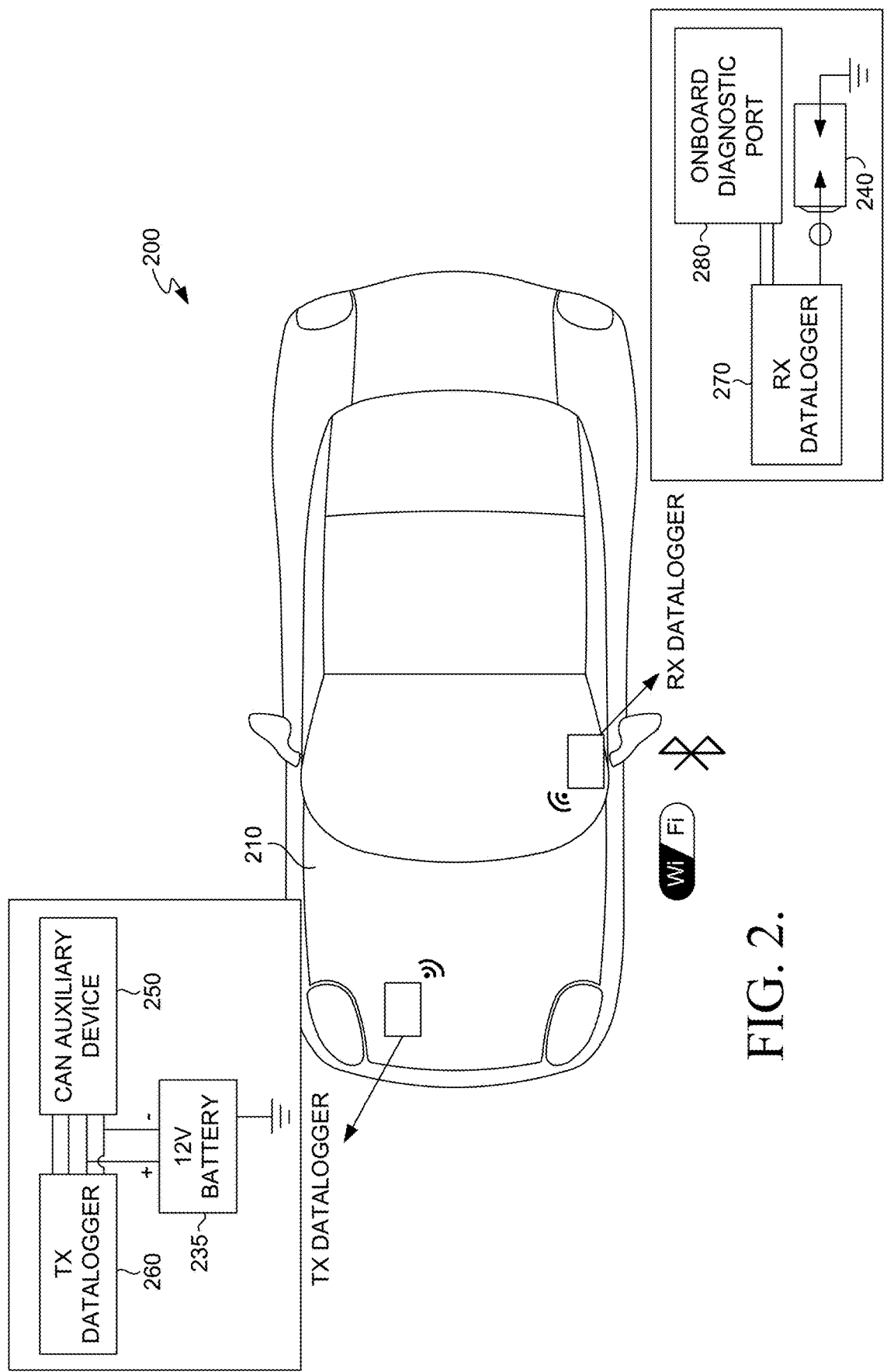
FIG. 2 schematically shows an example of a system for wireless communication between a transmitting node in an engine compartment and a receiving node in the passenger compartment.

FIG. 2 schematically shows an example of a configuration for using wireless data communication to allow data from an auxiliary sensor to be logged and combined with data from the engine control module (ECM) of a vehicle. In FIG. 2, a vehicle 200 includes an engine compartment 210. A transmitting node 260 is included in the engine compartment, along with an auxiliary CAN device 250, such as an auxiliary sensor. The transmitting node 260 and auxiliary CAN device 250 can receive power from battery 235. The transmitting node 260 can log data from auxiliary CAN device 250 and then use wireless data communication to transmit the log data to a corresponding receiving node 270. The receiving node 270 is included in the passenger compartment of the vehicle. In addition to being in wireless data communication with transmitting node 260, the receiving node 270 can request data from the ECM, or the receiving node 270 can listen to the primary CAN and log values sent to and/or from the ECM. Receiving node 270 is also connected to 12V power 240.

Figure 3:
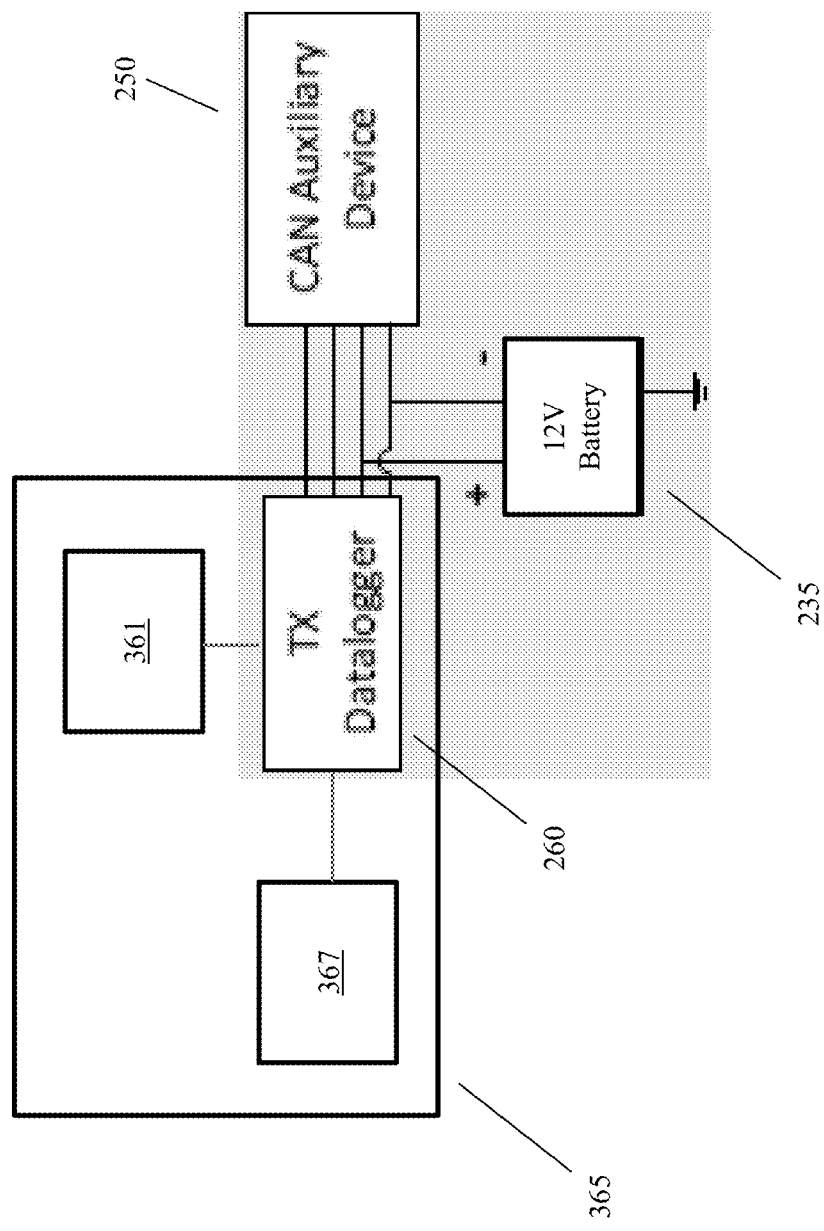
FIG. 3 shows additional details for a transmitting node and associated components.

FIG. 3 provides additional details regarding the transmitting node 260 and associated components. In FIG. 3, the transmitting node enclosure 365 for transmitting node 260 is also represented. The transmitting node enclosure 365 can correspond to any convenient type of enclosure that provides sufficient environmental protection for the transmitting node 260 while also permitting desired wireless communication by the transmitting node 260 via wireless communication system 361. The wireless communication system 361 can include an antenna as well as any other typical components for enabling wireless communication (sending and receiving). Optionally, the wireless communication system 361 can correspond to components that are integrated with the transmitting node 260.

The transmitting node enclosure 365 can also include one or more internal transmitting node sensors, such as a temperature sensor 367. Temperature sensor 367 (and/or other internal datalogger sensors) can monitor conditions within the transmitting node enclosure 365 to allow the transmitting node to turn off if conditions become unfavorable, such as when the temperature exceeds a threshold value.

Figure 4:
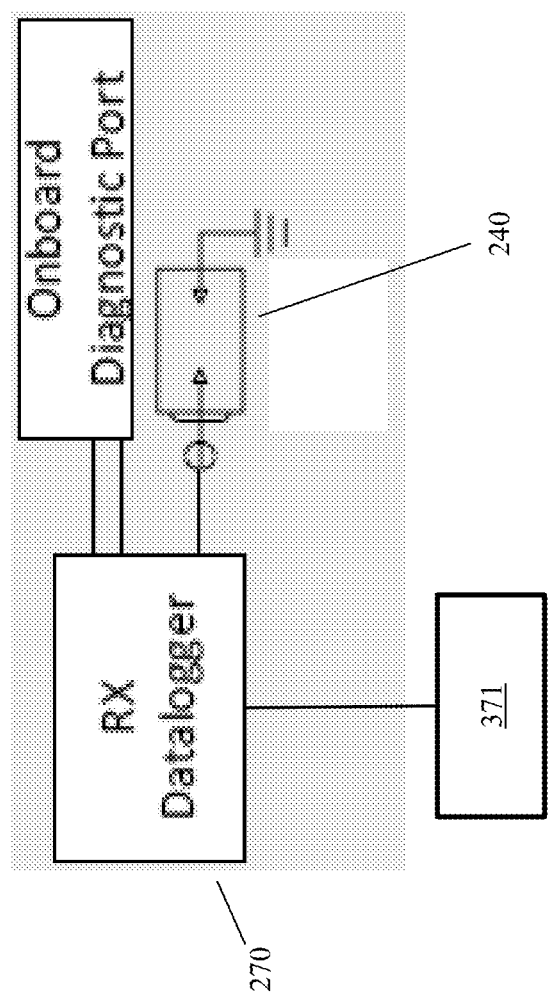
FIG. 4 shows additional details for a receiving node and associated components.

FIG. 4 provides additional details for the receiving node 270. In FIG. 4, receiving node 270 is connected to a wireless communication system 371 that can similarly allow receiving and transmitting of wireless data. In the examples shown in FIGS. 2 to 4, the transmitting node 260 and the receiving node 270 can be in wireless data communication via wireless communication system 361 and wireless communication system 371. In addition to receiving data from transmitting node 260, the receiving node 270 can request data from the ECM and/or or the receiving node 270 can listen to the primary CAN and log values sent to and/or from the ECM. The receiving node 270 can receive power via 12 V power system 240.

Off-Vehicle Data Communication

During operation, a transmitting node can provide data from one or more auxiliary sensors in an engine compartment to a receiving node. The receiving node can optionally also receive data from the engine control module. In some aspects, the data received by the receiving node can be processed and/or analyzed in the vehicle for use in any desired manner.

Additionally or alternately, it may be desirable to transmit the data accumulated by the receiving node to an off-vehicle data center for further processing and/or analysis. For example, a wireless communication system 371 can also be used to transmit data to an off-vehicle data center. For example, when a vehicle passes in sufficiently close proximity to a remote wireless access port or other remote network receiver, the receiving node 270 can transmit received data via wireless communication system 371 to an off-vehicle system. As another example, a cellular data network can correspond to a network receiver for transmission of accumulated data to an off-vehicle data center. In such an aspect, wireless communication system 371 can optionally further include an interface for connection to a conventional cellular phone network. This can allow for transmission of data from receiving node 270 to an off-vehicle data center at any convenient time while the vehicle is in range of a suitable cellular network. It is noted that a receiving node can include a wireless communication system in aspects where the data communication with the transmitting node corresponds to wired data communication.

Figure 5:
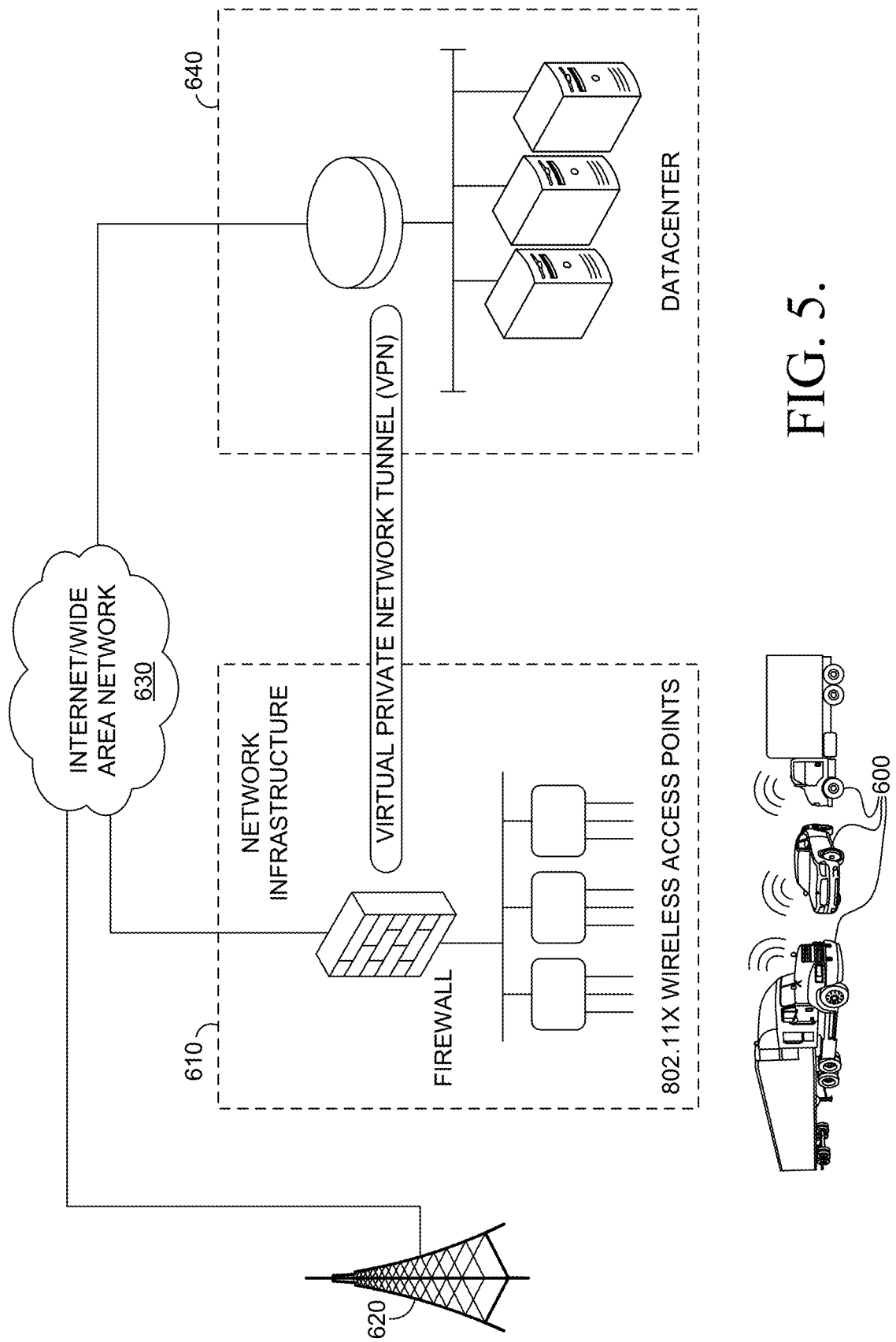
FIG. 5 schematically shows an example of a configuration for communication between a vehicle datalogger and an off-vehicle datacenter.

FIG. 5 schematically shows an example transmission of accumulated data from a receiving node on a vehicle to a remote data center. In FIG. 5, a receiving node on a vehicle 600 can transmit accumulated data via either a wireless 802.11 type network 610 (e.g., Wi-Fi, Bluetooth) or via a cellular network 620. For either type of transmission, the accumulated data can then be transferred over a wide area network 630 (optionally private) to a data center 640.

Additional Embodiments

Embodiment 1

A method for acquiring engine data and auxiliary sensor data, comprising: determining, by a transmitting node, an activity status of a receiving node, a polling rate for determining the activity status of the receiving node being once per 60 seconds or less, the transmitting node being housed in a transmitting node enclosure in an engine compartment of a vehicle, the engine compartment comprising a firewall; receiving, by the transmitting node, data from an auxiliary sensor; and transmitting, by the transmitting node, at least a portion of the received data to a receiving node, the receiving node being located on an opposing side of the firewall relative to the transmitting node, wherein the auxiliary sensor optionally comprises at least one of an oil quality sensor and a transmission fluid quality sensor. It is noted that preferably the transmitting is responsive to the determining that the receiving node is in an active status.

Embodiment 2

The method of Embodiment 1, further comprising: detecting at least one of a temperature inside the transmitting node enclosure and a temperature associated with the transmitting node; and shutting down the transmitting node if a detected temperature inside the enclosure or a detected temperature associated with the transmitting node is greater than a threshold temperature, the threshold temperature optionally being 55° C. to 75° C.

Embodiment 3

The method of any of the above embodiments, further comprising sending, by the receiving node, at least a portion of the transmitted data to a network receiver located external to the vehicle.

Embodiment 4

The method of any of the above embodiments, further comprising receiving, by the receiving node, additional data from an engine control module.

Embodiment 5

The method of any of the above embodiments, wherein the transmitting node and the receiving node are not in data communication via a controller area network that includes the engine control module; or wherein the auxiliary sensor is not in data communication with the engine control module; or a combination thereof.

Embodiment 6

The method of any of the above embodiments, wherein determining an activity status comprises: transmitting, by the transmitting node, a message to the receiving node; and detecting a response from the receiving node, the method optionally further comprising activating, by the transmitting node in response to detecting a response from the receiving node, data collection by the auxiliary sensor.

Embodiment 7

The method of any of the above embodiments, wherein the transmitting at least a portion of the received data to a receiving node comprises wired data communication, wireless data communication, or a combination thereof.

Embodiment 8

The method of any of the above embodiments, further comprising monitoring real clock time, the method optionally further comprising matching the monitored real clock time with a time associated with a measurement by the auxiliary sensor.

Embodiment 9

An engine data acquisition system, comprising: an auxiliary sensor located within an engine compartment of a vehicle, the engine compartment comprising a firewall; a transmitting node enclosure in the engine compartment, the transmitting node enclosure comprising an ingress protection rating versus liquids of 7 or more; a transmitting node located within the transmitting node enclosure in data communication with the auxiliary sensor, the transmitting node comprising a sleep mode function with a sleep time interval of about 60 seconds or more; a temperature sensor located within the transmitting node enclosure in data communication with the transmitting node; and a receiving node in data communication with the transmitting node, the receiving node located on an opposing side of the firewall relative to the transmitting node, wherein the auxiliary sensor optionally comprises at least one of an oil quality sensor and a transmission fluid quality sensor.

Embodiment 10

The engine data acquisition system of Embodiment 9, wherein the transmitting node enclosure comprises an ingress protection rating of IPX7, IPX8, IP67, or IP68; or wherein the transmitting node receives power from a battery associated with the vehicle; or a combination thereof.

Embodiment 11

The engine data acquisition system of Embodiment 9 or 10, wherein the data communication between the transmitting node and the receiving node comprises wireless communication, the transmitting node comprising a first wireless communication system, the receiving node comprising a second wireless communication system, the wireless communication optionally comprising Bluetooth communication, Wi-Fi communication, communication using a system compatible with an IEEE 802.11 specification, or a combination thereof.

Embodiment 12

The engine data acquisition system of Embodiment 9 or 10, wherein the data communication between the transmitting node and the receiving node comprises wired communication via a direct current power line bus (optionally 12 V), the engine data acquisition system further comprising a first power line communication coupling associated with the transmitting node and a second power line communication coupling associated with the receiving node.

Embodiment 13

The engine data acquisition system of any of Embodiments 9 to 12, wherein the transmitting node and the receiving node are not in data communication via a controller area network that includes the engine control module; or wherein the auxiliary sensor is not in data communication with the engine control module; or a combination thereof.

Embodiment 14

The engine data acquisition system of any of Embodiments 9 to 13, the receiving node being further in wireless data communication with a network receiver located external to the vehicle.

Embodiment 15

The engine data acquisition system of any of Embodiments 9 to 14, wherein the temperature sensor is configured to detect a temperature inside the enclosure, a temperature associated with the transmitting node, or a combination thereof.

When numerical lower limits and numerical upper limits are listed herein, ranges from any lower limit to any upper limit are contemplated. While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains.

The present invention has been described above with reference to numerous embodiments and specific examples. Many variations will suggest themselves to those skilled in this art in light of the above detailed description. All such obvious variations are within the full intended scope of the appended claims.

The invention claimed is:

1. A method for acquiring engine data and auxiliary sensor data, comprising: determining, by a transmitting node, an activity status of a receiving node, a polling interval for determining the activity status of the receiving node being 60 seconds or more, the transmitting node being housed in a transmitting node enclosure in an engine compartment of a vehicle, the engine compartment comprising a firewall; receiving, by the transmitting node, data from an auxiliary sensor; and transmitting, by the transmitting node, at least a portion of the received data to a receiving node, the receiving node being located on an opposing side of the firewall relative to the transmitting node.

2. The method of claim 1, further comprising:
detecting at least one of a temperature inside the transmitting node enclosure and a temperature associated with the transmitting node; and
shutting down the transmitting node if a detected temperature inside the enclosure or a detected temperature associated with the transmitting node is greater than a threshold temperature.

3. The method of claim 2, wherein the threshold temperature is 55° C. to 75° C.

4. The method of claim 1, further comprising sending, by the receiving node, at least a portion of the transmitted data to a network receiver located external to the vehicle.

5. The method of claim 1, further comprising receiving, by the receiving node, additional data from an engine control module.

6. The method of claim 1, wherein the transmitting node and the receiving node are not in data communication via a controller area network that includes the engine control module; or wherein the auxiliary sensor is not in data communication with the engine control module; or a combination thereof.

7. The method of claim 1, wherein determining an activity status comprises:
transmitting, by the transmitting node, a message to the receiving node; and
detecting a response from the receiving node.

8. The method of claim 7, wherein the method further comprises activating, by the transmitting node in response to detecting a response from the receiving node, data collection by the auxiliary sensor.

9. The method of claim 1, wherein the auxiliary sensor comprises at least one of an oil quality sensor and/or transmission fluid quality sensor and/or any CAN based sensor.

10. The method of claim 1, further comprising monitoring real clock time.

11. The method of claim 1, wherein the transmitting at least a portion of the received data to a receiving node comprises wired data communication, wireless data communication, or a combination thereof.

12. An engine data acquisition system, comprising:
an auxiliary sensor located within an engine compartment of a vehicle, the engine compartment comprising a firewall;
a transmitting node enclosure in the engine compartment, the transmitting node enclosure comprising an ingress protection rating versus liquids of 7 or more;
a transmitting node located within the transmitting node enclosure in data communication with the auxiliary sensor, the transmitting node comprising a sleep mode function with a sleep time interval of about 60 seconds or more;
a temperature sensor located within the transmitting node enclosure in data communication with the transmitting node; and
a receiving node in data communication with the transmitting node, the receiving node located on an opposing side of the firewall relative to the transmitting node.

13. The engine data acquisition system of claim 12, wherein the transmitting node enclosure comprises an ingress protection rating of IPX7, IPX8, IP67, or IP68.

14. The engine data acquisition system of claim 12, wherein the data communication between the transmitting node and the receiving node comprises wireless communication, the transmitting node comprising a first wireless communication system, the receiving node comprising a second wireless communication system, the wireless communication optionally comprising communication using a system compatible with an IEEE 802.11 specification or IEEE 802.15.1 specification, or a combination thereof.

15. The engine data acquisition system of claim 12, wherein the data communication between the transmitting node and the receiving node comprises wired communication via a direct current power line bus, the engine data acquisition system further comprising a first power line communication coupling associated with the transmitting node and a second power line communication coupling associated with the receiving node.

16. The engine data acquisition system of claim 12, wherein the transmitting node and the receiving node are not in data communication via a controller area network that includes the engine control module; or wherein the auxiliary sensor is not in data communication with the engine control module; or a combination thereof.

17. The engine data acquisition system of claim 12, the receiving node being further in wireless data communication with a network receiver located external to the vehicle.

18. The engine data acquisition system of claim 12, wherein the auxiliary data sensor comprises at least one of an oil quality sensor and/or transmission fluid quality sensor and/or any CAN based sensor.

19. The engine data acquisition system of claim 12, wherein the transmitting node receives power from a battery associated with the vehicle.

20. The engine data acquisition system of claim 12, wherein the temperature sensor is configured to detect a temperature inside the enclosure, a temperature associated with the transmitting node, or a combination thereof.

* * * * *